United States Patent
Sato et al.

(10) Patent No.: US 9,424,765 B2
(45) Date of Patent: Aug. 23, 2016

(54) IMAGE PROCESSING APPARATUS, IMAGE PROCESSING METHOD, AND PROGRAM

(75) Inventors: Mayuko Sato, Tokyo (JP); Kazutoshi Ohno, Kanagawa (JP); Rie Nagasawa, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 355 days.

(21) Appl. No.: 13/544,405

(22) Filed: Jul. 9, 2012

(65) Prior Publication Data

US 2013/0176285 A1      Jul. 11, 2013

Related U.S. Application Data

(60) Provisional application No. 61/536,728, filed on Sep. 20, 2011.

(51) Int. Cl.
*G09G 3/00*      (2006.01)
*G06T 11/60*      (2006.01)

(52) U.S. Cl.
CPC . *G09G 3/00* (2013.01); *G06T 11/60* (2013.01)

(58) Field of Classification Search
USPC .................................................. 345/641, 629
See application file for complete search history.

(56) References Cited

U.S. PATENT DOCUMENTS

| | | | |
|---|---|---|---|
| 7,586,524 B2* | 9/2009 | Tsue et al. | 348/231.2 |
| 8,890,896 B1* | 11/2014 | Tseng | 345/633 |
| 2001/0017668 A1* | 8/2001 | Wilcock | G06F 17/30265 348/552 |
| 2002/0136590 A1* | 9/2002 | Himmel | 402/73 |
| 2010/0164992 A1* | 7/2010 | Akiya | 345/641 |
| 2011/0022634 A1* | 1/2011 | Takata et al. | 707/776 |
| 2011/0026835 A1* | 2/2011 | Ptucha | G06F 17/30247 382/209 |
| 2011/0085057 A1* | 4/2011 | Takahashi | 348/231.3 |

FOREIGN PATENT DOCUMENTS

JP      2007-318208      12/2007

* cited by examiner

*Primary Examiner* — Robin Mishler
(74) *Attorney, Agent, or Firm* — Oblon, McClelland, Maier & Neustadt, L.L.P.

(57) ABSTRACT

An information processing apparatus that includes a memory that stores a plurality of images, and a controller that obtains a template having attributes applied to each of a plurality of display areas, selects images matching the attributes of the respective display areas from among the plurality of images stored in the memory, disposes the selected images matching the attributes of the respective display areas in the respective display areas, and controls a display to display the template including the selected images disposed in the respective display areas.

19 Claims, 13 Drawing Sheets

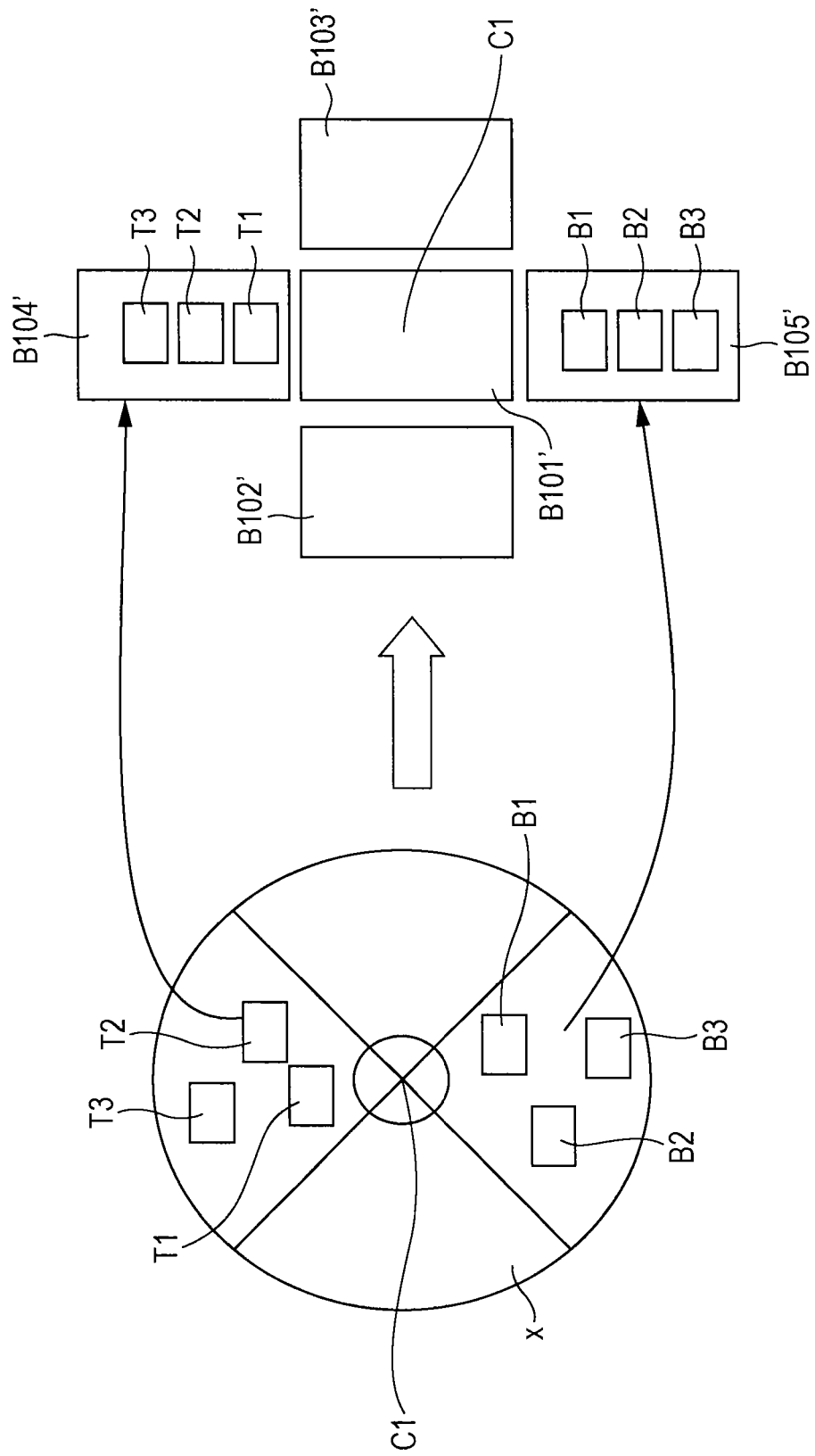

IMAGE PROCESSING APPARATUS, IMAGE PROCESSING METHOD, AND PROGRAM

CROSS REFERENCE TO RELATED APPLICATION

The present application claims the benefit of the earlier filing date of U.S. Provisional Patent Application Ser. No. 61/536,728 filed on Sep. 20, 2011, the entire contents of which is incorporated herein by reference.

BACKGROUND

1. Field of the Disclosure

The present disclosure relates to an ideal image processing apparatus and image processing method applied to a mobile terminal that conducts image display, for example, as well as to a program that executes the image processing method.

2. Description of Related Art

Among compact, freely portable terminal devices such as mobile phone terminals, terminal devices that internally house a camera are proliferating. Image data that has been obtained by shooting with a camera unit provided in such a terminal device is stored by internal memory in the terminal device. Then, a shot image stored by the memory is read out, and the shot image is displayed with a display unit provided in the terminal device.

When displaying an image with a display unit, a process that successively displays shot images one at a time is conducted, or what is called a thumbnail display process is conducted, which reduces multiple shot images and displays them as a list.

Japanese Unexamined Patent Application Publication No. 2007-318208, for example, describes an image processing technology that selects, composites, and displays a plurality of images stored in internal memory.

SUMMARY

As discussed above, when displaying camera images in conventional terminal devices such as mobile phone terminals, shot images are successively displayed, or reduced images are simply displayed as a list. Japanese Unexamined Patent Application Publication No. 2007-318208, for example, describes an example of lining up and displaying a plurality of images in FIG. 6, and describes how images are selected according to their importance when selecting that plurality of images. However, it cannot be said that simply reducing, lining up, and displaying a plurality of images them yields a display mode that is easy for a user to view, and more advanced display has been sought.

The present disclosure has been devised in light of such points, and takes as an object to provide an image processing apparatus, an image processing method, and a program able to favorably display a plurality of images obtained by shooting, etc.

According to a first exemplary embodiment, the disclosure is directed to an information processing apparatus that includes a memory that stores a plurality of images, and a controller that obtains a template having attributes applied to each of a plurality of display areas, selects images matching the attributes of the respective display areas from among the plurality of images stored in the memory, disposes the selected images matching the attributes of the respective display areas in the respective display areas, and controls a display to display the template including the selected images disposed in the respective display areas.

According to the present disclosure, by selecting a template, images matching the attributes of respective display windows in that template are selected, and a plurality of images matching the attributes of the display windows provided in the template can be simultaneously displayed.

According to the present disclosure, by selecting a template to display, a plurality of images matching the attributes of display windows provided the template can be simultaneously displayed, and advanced display of multiple images based on the attributes of the respective display windows in the template becomes possible.

BRIEF DESCRIPTION OF DRAWINGS

FIG. 14 is an explanatory diagram illustrating an exemplary display image resulting from a seventh display process according to an embodiment of the present disclosure.

DETAILED DESCRIPTION

Exemplary embodiments of the present disclosure will be described in the following order.
1. Configuration of terminal device (FIG. 1, FIG. 2)
2. Overview of display using a template (FIG. 3)
3. First display process (FIG. 4, FIG. 5)
4. Second display process (FIG. 6, FIG. 7)
5. Third display process (FIG. 8, FIG. 9)
6. Fourth display process (FIG. 10, FIG. 11)
7. Fifth display process (FIG. 12)
8. Sixth display process (FIG. 13)
9. Seventh display process (FIG. 14)
10. Modifications

[1. Configuration of Terminal Device]

Figure 1:
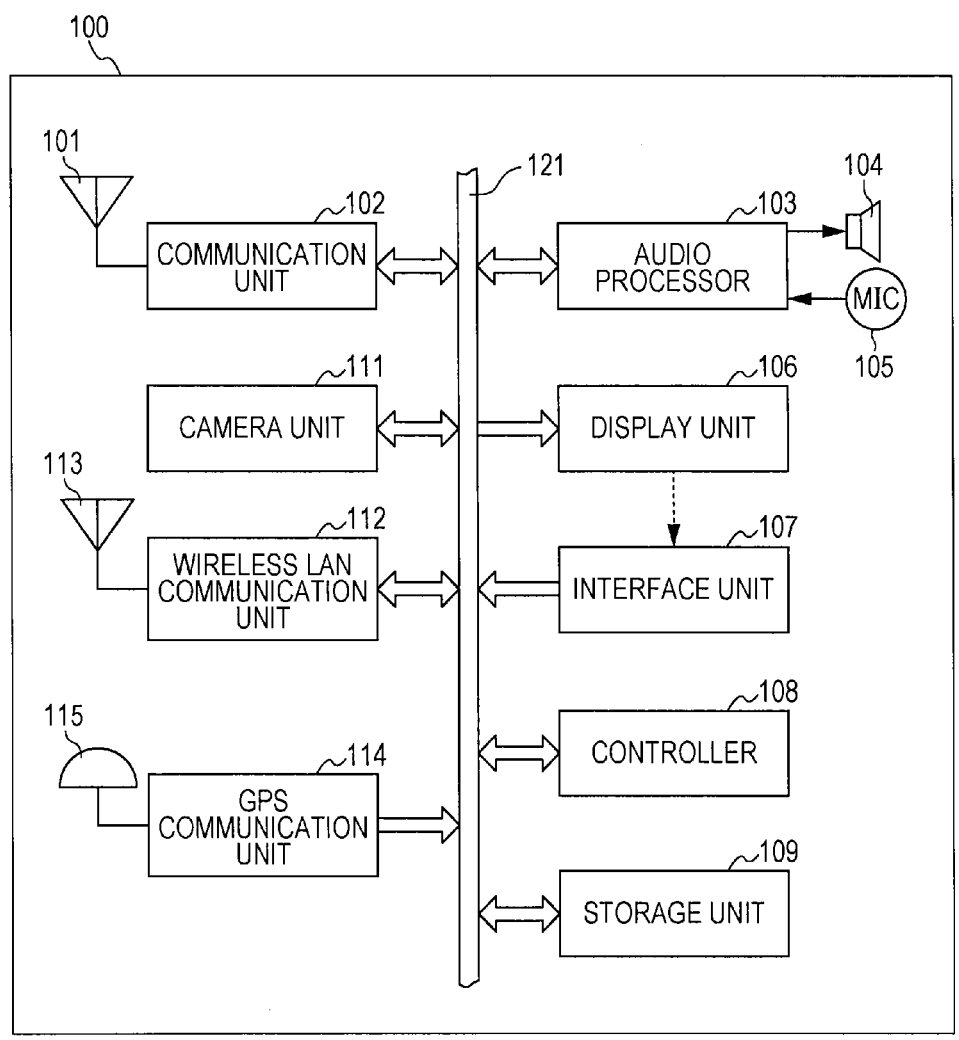
FIG. 1 is a block diagram illustrating an exemplary configuration of a terminal device according to an embodiment of the present disclosure.
Figure 2:
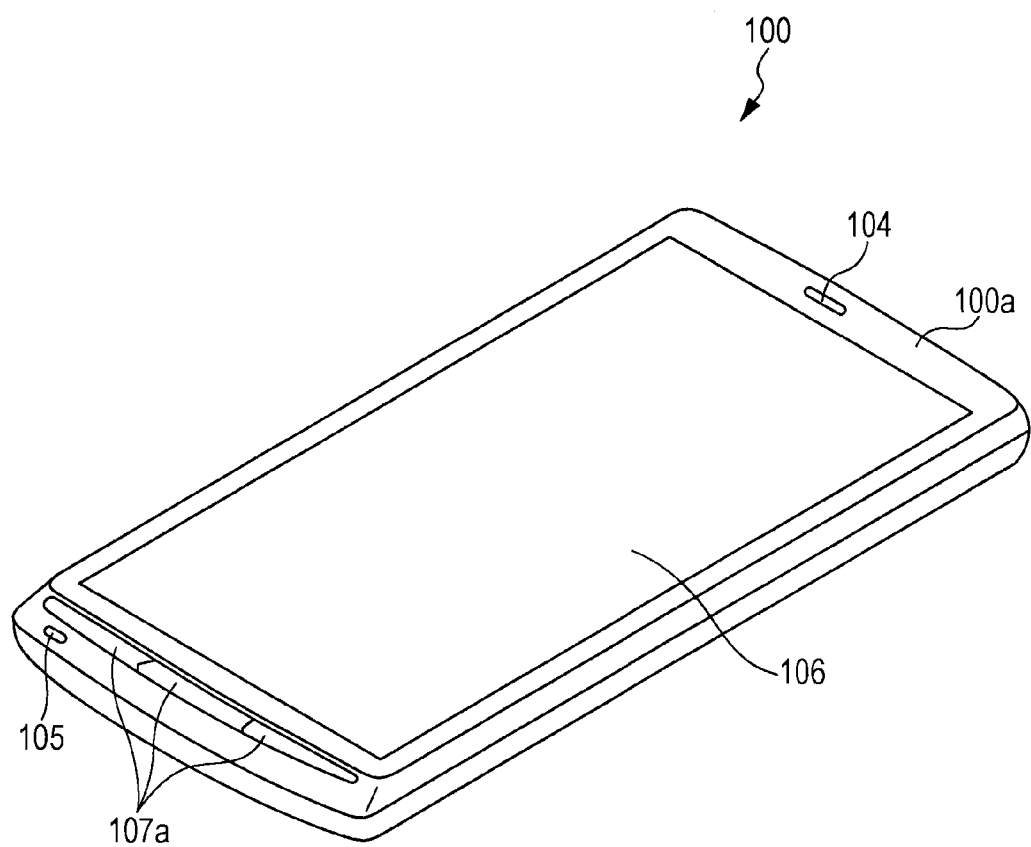
FIG. 2 is a perspective view illustrating an exemplary shape of a terminal device according to an embodiment of the present disclosure.

FIG. 1 illustrates a configuration of a terminal device exemplifying an embodiment of the present disclosure, while FIG. 2 illustrates an exemplary exterior of a terminal device.

The terminal device 100 illustrated in FIG. 2 is an example applied to a multi-functional mobile phone terminal device called a smartphone. As illustrated in FIG. 2, a display unit 106 provided with a comparatively large display panel (approximately 4 inches diagonally, for example) is disposed on the front face 100a of the terminal device 100. The display unit 106 is configured having a touch panel disposed on its surface, for example, such that touch operations on the display screen can be conducted.

Also, the terminal device 100 has a telephony speaker 104 disposed at the top of its front face, as well as a telephony microphone 105 and a plurality of operable keys 107a disposed at the bottom of its front face. With these operable keys 107a and the touch panel disposed on the display unit 106, an operable unit 107 to be discussed later is configured. Operable keys 107a may also be disposed at positions not illustrated, such as on the sides, for example.

Also, a lens of a camera unit 111 is disposed on the back face opposite to the front face 100a illustrated in FIG. 2. Positioning a lens on the back face is one example, and a lens of a camera unit 111 may also be positioned on the front face.

Next, a configuration of the terminal device 100 will be described with reference to FIG. 1.

The terminal device 100 is provided with a radio communication unit 102 for conducting radio communication with a base station for radio telephony, and an antenna 101 is connected to the radio communication unit 102. The radio communication unit 102 conducts processes for transmitting and receiving radio signals under control by a controller 108 connected via a bus line 121.

When telephony audio data is received by the radio communication unit 102 during audio telephony, the audio data is supplies to an audio processor 103 via the bus line 121. A demodulation process is conducted at the audio processor 103 and an analog audio signal is obtained. Then, the analog audio signal obtained by the audio processor 103 is supplied to the speaker 104, and audio is output from the speaker 104.

Also, an audio signal output by the microphone 105 is converted into audio data in a transmit format by the audio processor 103. The converted audio data is supplied to the radio communication unit 102 via the bus line 121 and radio-transmitted.

In the case of conducting email data transmission and reception or data communication via a network such as the Internet with the radio communication unit 102, the radio communication unit 102 conducts processes for transmitting and receiving under control by the controller 108. For example, data received by the radio communication unit 102 is supplied to a storage unit 109 and stored, and a display or other process based on the stored data is conducted under control by the controller 108. Also, data stored by the storage unit 109 is supplied to the radio communication unit 102 and radio-transmitted. The storage unit 109 also stores programs required for controlling the terminal device 100 and data for templates to be discussed later. For example, a program that executes a process for controlling the display of images by the display unit 106 to be discussed later is also stored in the storage unit 109.

The storage unit 109 comprises non-volatile memory, for example. Alternatively, the storage unit 109 may also comprise memory that is not non-volatile or a hard disk drive, etc.

Also, operational commands from the operable unit 107 are delivered to the controller 108 via the bus line 121, and the controller 108 issues commands for various operations and conducts processes according to those operational commands.

For the display panel provided in the display unit 106, a liquid crystal panel or an organic EL (Electro Luminescence) display panel may be used, for example. Display processes by the display unit 106 are executed under control by the controller 108. For example, display of the telephony state as a radio telephone terminal and an address book, etc., display of electronic mail, display of stored images shot with the camera unit 111, and display of images obtained from a server accessed via the Internet, etc. are executed under control by the controller 108.

Also, the camera unit 111 obtains an image signal from imaging light focused onto the imaging surface of an imaging sensor via a lens. An image signal obtained by the camera unit 111 is supplied to the storage unit 109 via the bus line 121 and stored in the storage unit 109. In so doing, a camera image storage process is conducted. An image signal imaged by the camera unit 111 may be a still image composed of an image signal for one frame, or a motion image composed of an image signal for multiple frames. Furthermore, the storage unit 109 is capable of storing a plurality of still images and a plurality of motion images.

The controller 108 conducts processes for analyzing images stored by the storage unit 109. For example, the controller 108 conducts pre-programmed recognition processes such as a facial recognition process that detects the face of a person in an image or a process that detects the colors of clothing worn by a person in an image. Specific examples of conducting such recognition processes will be discussed later.

Additionally, the terminal device 100 is provided with a GPS (Global Positioning System) receiver 114, and conducts a positioning process that receives positioning signals with the GPS receiver 114 and acquires the current location of the terminal device 100 by analyzing the received signals. An antenna 115 is connected to the GPS receiver 114. Information on the current position acquired by the GPS receiver 114 is supplied to the controller 108 via the bus line 121.

The controller 108 uses the supplied information on the current position to acquire information on the area around the current position and to display a map of the area around the current position, etc. Also, when an image is shot with the camera unit 111, information on the shooting location is added to the image signal stored in the storage unit 109 under control by the controller 108.

[2. Overview of Display Using a Template]

Next, a display process conducted when displaying with the display unit 106 an image that has been shot by the camera unit 111 and stored by the storage unit 109 will be described. If for example image signals for single frames are stored in the storage unit 109 as still images, the controller 108 reads out relevant images from the storage unit 109 and displays them on the display unit 106 due to an operation for displaying shot images.

At this point, the images displayed by the display unit 106 successively change one at a time due to a user operation for successively changing images. A thumbnail display that reduces, lines up, and displays respective images representing still images and motion images is also possible.

Such a display that changes images one at a time and a thumbnail display are image display processes that have been conventionally conducted. However, in the example of the present embodiment, a display of shot images using a windowed template is additionally possible.

First, an overview of a display process using a windowed template will be described with reference to FIG. 3. This process for displaying shot images using a windowed template is executed under control by the controller 108 when a corresponding display mode has been set by a user operation. The windowed template herein functions as a board upon which images are arranged and displayed in respective windows.

The controller 108 searches a storage unit 109 storing a plurality of images in advance for images that match attributes assigned to windows in the windowed template, and conducts an image compositing process that displays images found by the search inside the windows in the template.

Figure 3:
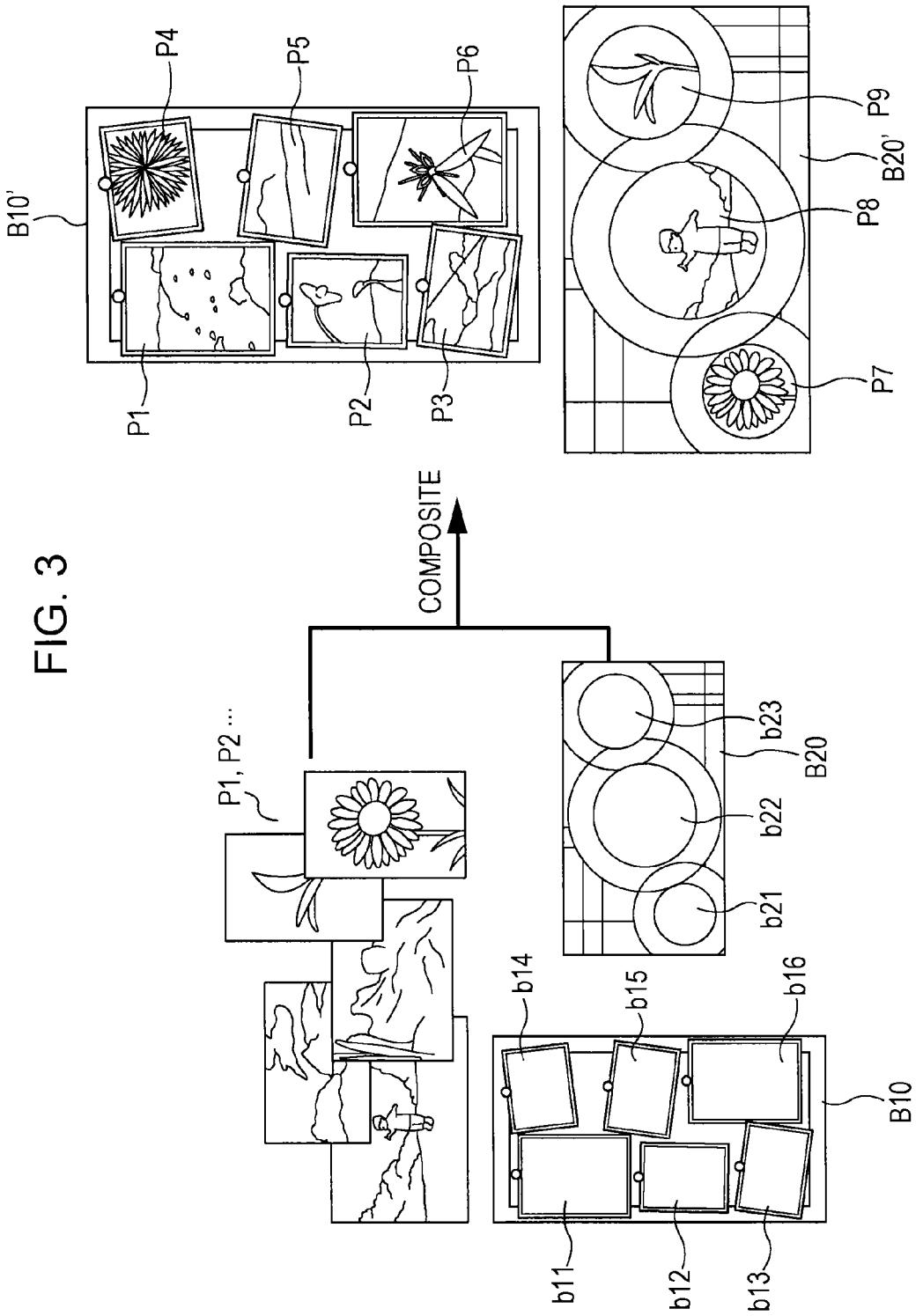
FIG. 3 is an explanatory diagram illustrating an overview of an exemplary display according to an embodiment of the present disclosure.

In other words, as illustrated in FIG. 3, assume that the storage unit 109 is storing a large number of images P1, P2, P3, ..., and that at least two templates B10 and B20 are available.

In the template B10, six windows b11, b12, b13, b14, b15, and b16 are disposed in an uneven arrangement. In this case, the three windows b11, b12, and b16 are taken to be portrait windows, while the other three windows b13, b14, and b15 are taken to be landscape windows. Also, the landscape windows b13, b14, and b15 are taken to be windows with slight respective tilts. Furthermore, the sizes of the individual windows are somewhat varied.

Additionally, respective attributes are individually set for each of the windows b11, b12, b13, b14, b15, and b16. Specific examples of attributes will be described with the specific examples in FIG. 4 and thereafter, but as a simple example, attributes selecting images with a portrait composition are set for the windows b11, b12, and b16, while attributes selecting images with a landscape composition are set for the windows b13, b14, and b15, for example.

In the template B20, three round windows b21, b22, and b23 with respectively different sizes are disposed. Respective attributes are individually set for these three windows.

In the non-window portion of the respective templates B10 and B20, a pre-made background image or graphics are depicted. However, the non-window portion of each template may also be a plain, solid color background.

When one template from among such a plurality of available templates B10, B20, ..., is selected by a user operation via the operable unit 107, the controller 108 selects a stored image that matches the attributes of a window in the selected template, and inserts the image into that window. At this point, the controller 108 reduces or enlarges the image according to the original size of the selected image. Also, a process that crops just a portion from a stored image as necessary may be conducted.

The templates B10' and B20' illustrated on the right side of FIG. 3 are examples wherein images that match attributes have been selected from among the stored images P1, P2, P3, ..., and are displayed inserted into the windows. In the case of the template B20', since the individual windows b21, b22, and b23 are round, the original images are reduced or enlarged, and then images P7, P8, and P9 that have been cropped into round shapes are inserted. In the case where there are many images that match the attributes, images randomly selected from the many images that match the attributes are selected. Randomly selecting an image is itself an attribute. Alternatively, instructions may be given as an attribute to select in order of shooting date and time or file number.

A template in which images have been inserted into windows in this way is displayed by the display unit 106 under control by the controller 108. In the case of saving a template with images inserted into its windows, the storage unit 109 stores the template. Herein, in the case where a template image is mentioned in the following description, a template for which a compositing process has been conducted in which images have been inserted into its windows is being referred to. Also, in the respective drawings, (') is applied to a template's reference sign to indicate a template image in which images have been inserted into its windows.

Next, specific examples of display processes will be described.

[3. First Display Process]

Figure 4:
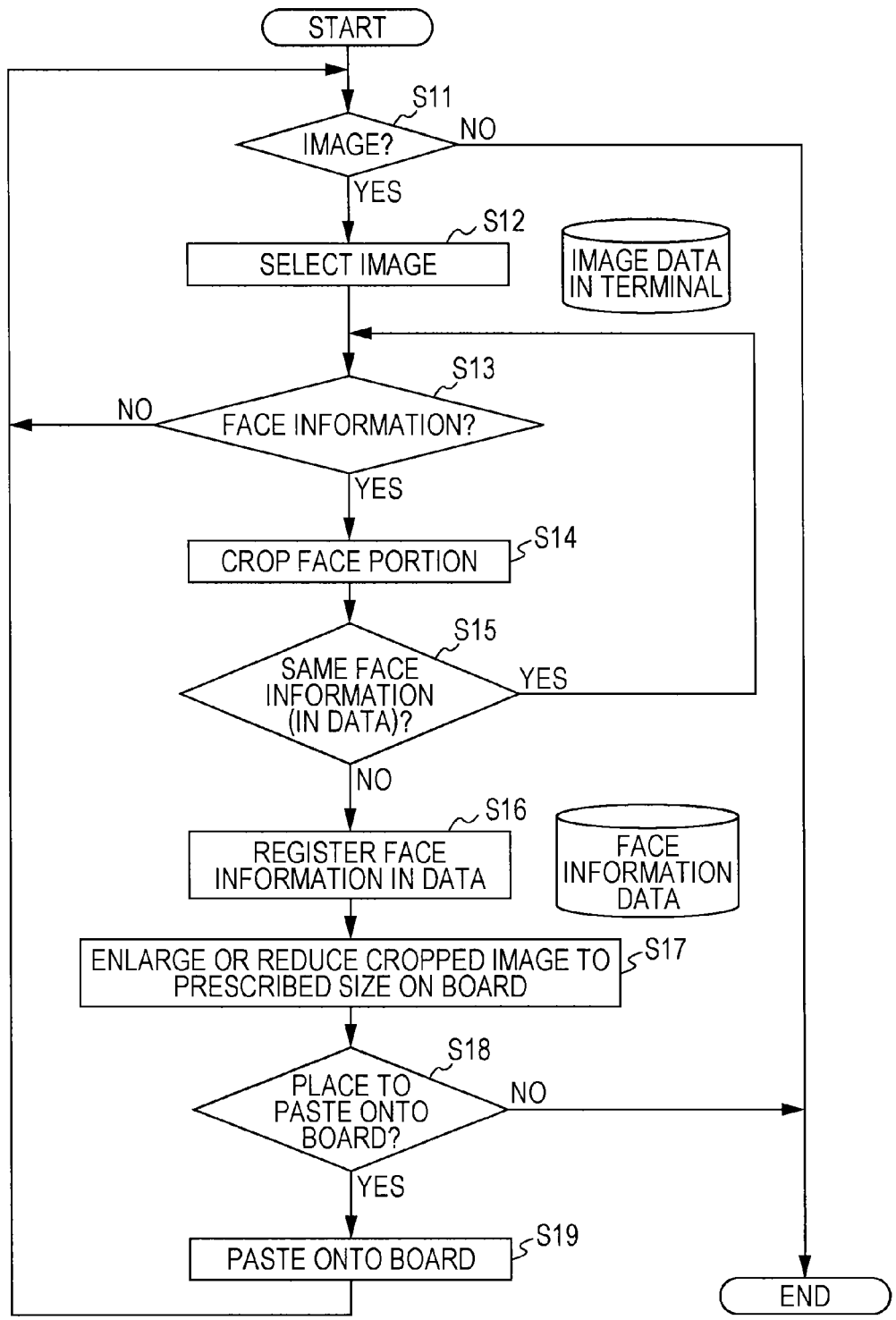
FIG. 4 is a flowchart illustrating a first display process according to an embodiment of the present disclosure.
Figure 5:
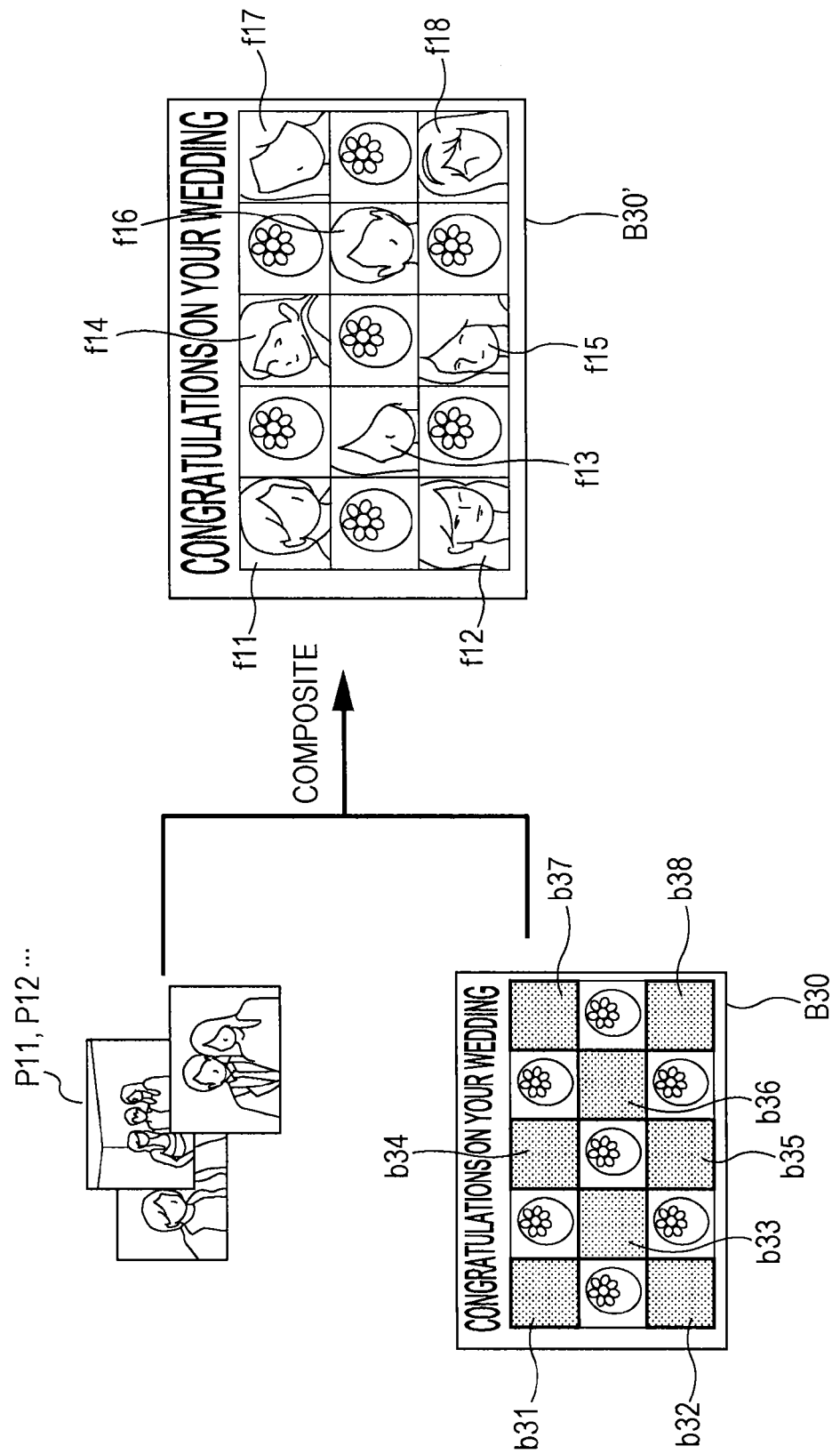
FIG. 5 is an explanatory diagram illustrating an exemplary display image resulting from a first display process according to an embodiment of the present disclosure.

FIG. 4 is a flowchart illustrating a first exemplary template image display process, while FIG. 5 illustrates an exemplary template image created with the display process. The template given in this example arranges face images showing the facial portions of several people that have been cropped from multiple still images (or one still image), and creates a pseudo-group photo. In this example, attributes that dispose face images are applied to windows in the template.

An image compositing process that disposes images in the template in this example will be described following the flowchart in FIG. 4.

First, one or more still images from which to crop face images are specified with a user operation from among image files stored by the storage unit 109. The specification herein is conducted in units of image files. Specifying in units of image files is one example, and images may be individually specified as candidates or not with a user operation, for example. Alternatively, all stored image files may be taken to be candidates without specifying particular image files.

When such a specification occurs, the controller 108 determines whether or not a candidate still image exists in the specified file or files (step S11). In the case where it is determined that a candidate still image does not exist in a corresponding file, the template image creation process herein ends.

Meanwhile, in the case where it is determined that a candidate still image does exist in a corresponding file, images are selected one at a time from among all images in that file (step S12), and a facial recognition process that determines whether or not a person's face exists in a selected image is conducted (step S13). In the case where it is determined by the facial recognition process that a face does exist, an image of the detected face portion is cropped (step S14). After cropping the face image, an image recognition process determines whether or not a face image of apparently the same person exists among the already cropped images (step S15). Herein, the cropped face image at this point is discarded in the case where a plurality of face images of the same person exist, and the process returns to step S13 and conducts another face detection process.

Also, in the case where a face image other than the already cropped face images cannot be detected from the current image in step S13, the process returns to step S11 and selects another image.

In the case where it is determined in step S15 that duplicate face images of the same person do not exist, the cropped face image is registered as face image data and stored by the storage unit 109 (step S16). Then, a size adjustment is conducted to enlarge or reduce the registered plurality of face images so as to match the size of the windows in the template acting as the board, and such that the sizes of the faces in the respective images become nearly equal (step S17).

After that, it is determined whether or not there is still a place in the template acting as the board where a face image has not been disposed in a window (step S18). In the case where a place where a face image has not been pasted does exist, a size-adjusted face image is disposed in that empty window (step S19). After conducting image compositing to dispose a face image, the process returns to the image candidate extraction processing in step S11. In the case where it is determined in step S18 that images have been pasted in all windows in the template acting as the board, the template image creation process ends.

FIG. 5 illustrates an example wherein a template image has been created with the process illustrated by the flowchart in FIG. 4.

In the example in FIG. 5, a layout in which eight rectangular windows b31 to b38 are disposed in a lattice is taken to as a template B30. The respective windows b31 to b38 are made to have attributes that dispose a face image. Then, images P11, P12, . . . shot at a specific party are specified as candidate images, for example, and a compositing process is conducted to dispose eight face images f1 to f8 detected from the images P11, P12, . . . in the windows b31 to b38. In so doing, a template image B30' is obtained as a pseudo-group photo of attendees to a specific party.

Herein, a message m1 suited to the purpose of the image has been prepared in advance at the top of the template B30. The example in FIG. 5 illustrates an example in which "Congratulations on Your Wedding" is displayed as the message m1. A plurality of templates with different messages are prepared in advance and selected with a user operation. Alternatively, it may also be configured such that a message can be freely input with a user operation.

In the case of creating such a template image as a pseudo-group photo, it may also be configured such that template data is distributed by those convening the party or wedding ceremony, for example. When distributing such template data, a specific server on the Internet may make template data available, such that a terminal device 100 is able to access that server and acquire template data, for example.

[4. Second Display Process]

Figure 6:
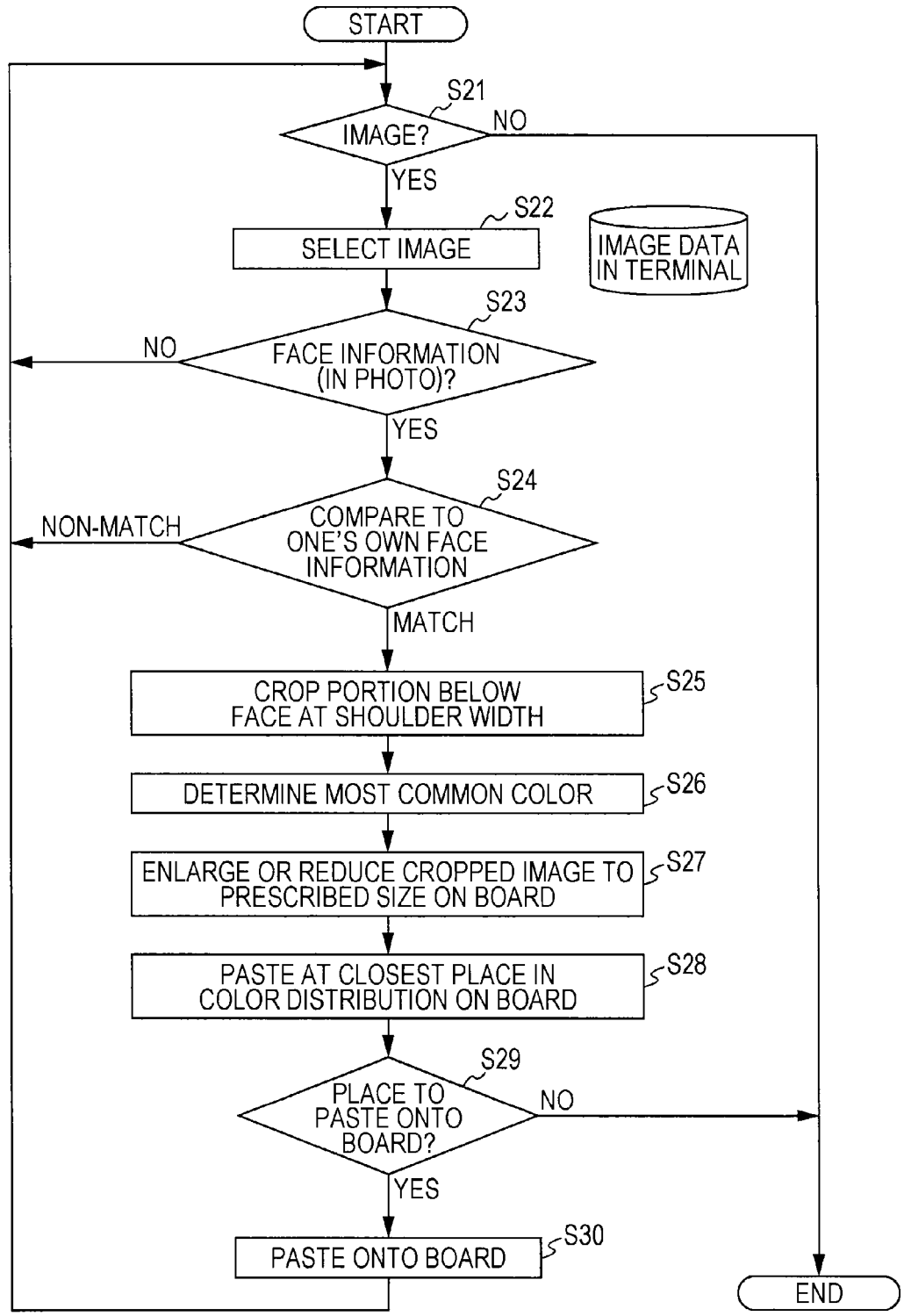
FIG. 6 is a flowchart illustrating a second display process according to an embodiment of the present disclosure.
Figure 7:
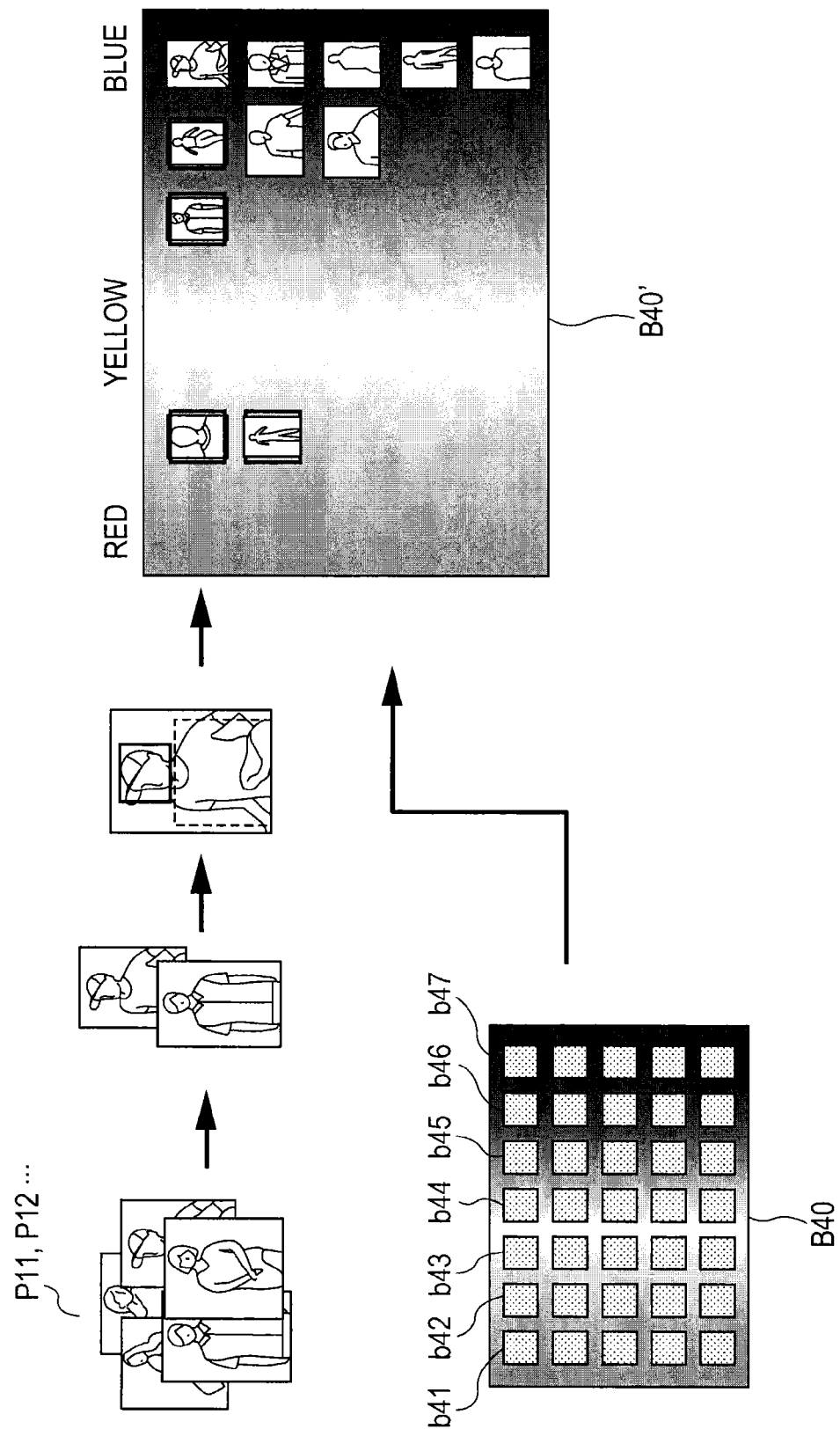
FIG. 7 is an explanatory diagram illustrating an exemplary display image resulting from a second display process according to an embodiment of the present disclosure.

FIG. 6 is a flowchart illustrating a second exemplary template image display process, while FIG. 7 illustrates an exemplary template image created with the display process. The template in this example crops images of persons from multiple still images (or one still image) and disposes the cropped images of persons in the template in an arrangement based on the color of their clothing to obtain a clothing color distribution image. In this example, color attributes are applied to windows in the template. In other words, respectively individual color attributes are set for a plurality of available windows. Specifically, there are windows having red color attributes, windows having yellow color attributes, windows having blue color attributes, and windows having attributes for colors which are intermediate between the above colors.

An image compositing process that disposes images in the template in this example will be described following the flowchart in FIG. 6.

First, it is determined with a user operation whether or not a candidate still image exists among the image files stored by the storage unit 109 (step S21). At this point, the template image creation process herein ends in the case where a candidate still image does not exist.

Then, in the case where it is determined that a candidate still image does exist in an image file, etc., images are successively selected one at a time from among all images in that file (step S22), and a facial recognition process that determines whether or not a person's face exists in a selected image is conducted (step S23). In the case where a face is not detected by the facial recognition process, the process returns to step S21, and another image recognition process is conducted.

Meanwhile, in the case where it is determined by the facial recognition process in step S23 that a face does exist in an image, the recognized face is compared to a preregistered image of the user's own face, and it is determined whether or not the faces match (step S24). In the case where it is determined by the comparison that they do not match, the process returns to step S21, and another image recognition process is conducted.

In the case where it is determined by the comparison in step S24 that they do match, the portion below the face is cropped from the corresponding image at shoulder width (step S25), and the most common color in the image of the cropped portion is determined (step S26). Then, the entire body of the corresponding person is cropped from the image, and that cropped image is enlarged or reduced to match the size of a window in the template acting as a board (step S27). However, in the case where the size is suitable, enlargement or reduction is not conducted.

After that, a process is conducted to paste the image obtained in step S27 into a window at a location whose attributes give the color closest to the color determined in step S26 (step S28), and it is determined whether or not there is an empty window whose attributes give the corresponding color (step S29). In the case where an empty window whose attributes give the corresponding color does not exist, the template image creation process herein ends.

In the case where a window whose attributes give the corresponding color does exist in step S29, the image obtained in step S27 is pasted (step S30), and the process returns to step S21.

FIG. 7 illustrates an example wherein a template image has been created with the process illustrated by the flowchart in FIG. 6.

In the example in FIG. 7, a template B40 is given by disposing seven windows b41 to b47 in the horizontal direction, with each of the windows b41 to b47 being plurally disposed in the vertical direction. However, the windows in this example in FIG. 7 merely indicate positions where images are pasted, and window frames are not displayed in the template B40 when in a state where no image is pasted.

Additionally, among the seven windows b41 to b47 in the horizontal direction, the window b41 on the left edge takes a red color attribute, the window b44 in the center takes a yellow color attribute, and the window b47 on the right edge takes a blue color attribute. Furthermore, the windows b42 and b43 take attributes of colors intermediate between red and yellow, while the windows b45 and b46 take attributes of colors intermediate between yellow and blue, such that the colors of the attributes of the seven windows b41 to b47 progressively vary from red to blue. Meanwhile, colors close to the colors of the attributes of the respective windows may be applied as the background colors of the template B40.

By preparing such a template B40, portions with people are extracted from images P21, P22, . . . , and in addition only images of a specific person (the user himself or herself) are extracted by face detection. Then, images of the specific person (the user himself or herself) are disposed in a color distribution of that person's clothing as illustrated on the right side of FIG. 7 as a template image B40' with images pasted thereon. In the case of the template image illustrated in FIG. 7, many images have been pasted in or near the blue area, indicating that the person mostly wears clothing whose color is close blue. From this, his or her clothing tendencies are understood.

Herein, in the example in FIGS. 6 and 7, it was configured such that a template image categorizing a specific person's clothing is obtained, but a template image may also categorize the clothing of all persons included in shot images, without specifying a particular person. Also, it may be configured such that specific objects other than images of persons are extracted and categorized by color. For example, it may be configured such that images depicting automobiles are collected, the image portions of automobiles are extracted from the images, and a template image illustrating a color distribution of automobiles is obtained.

[5. Third Display Process]

Figure 8:
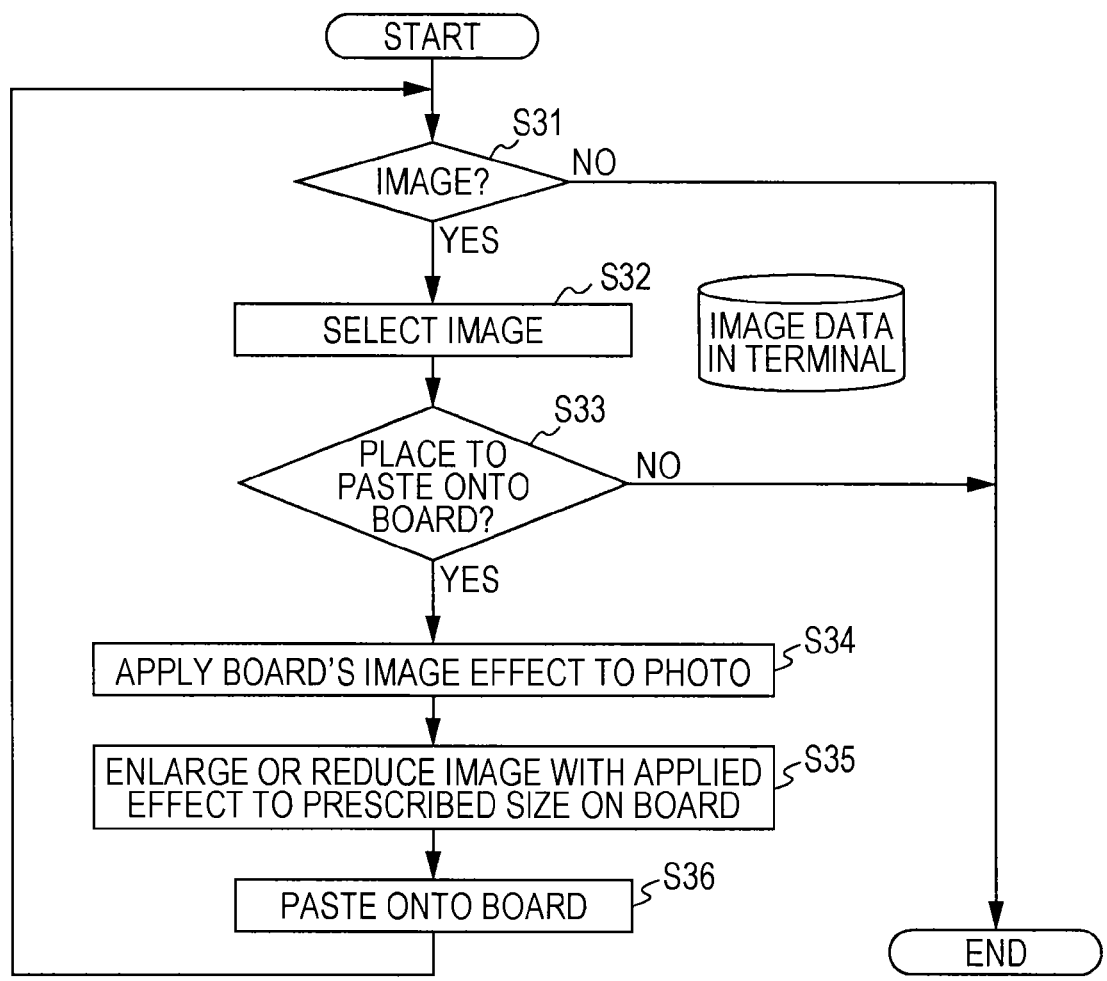
FIG. 8 is a flowchart illustrating a third display process according to an embodiment of the present disclosure.
Figure 9:
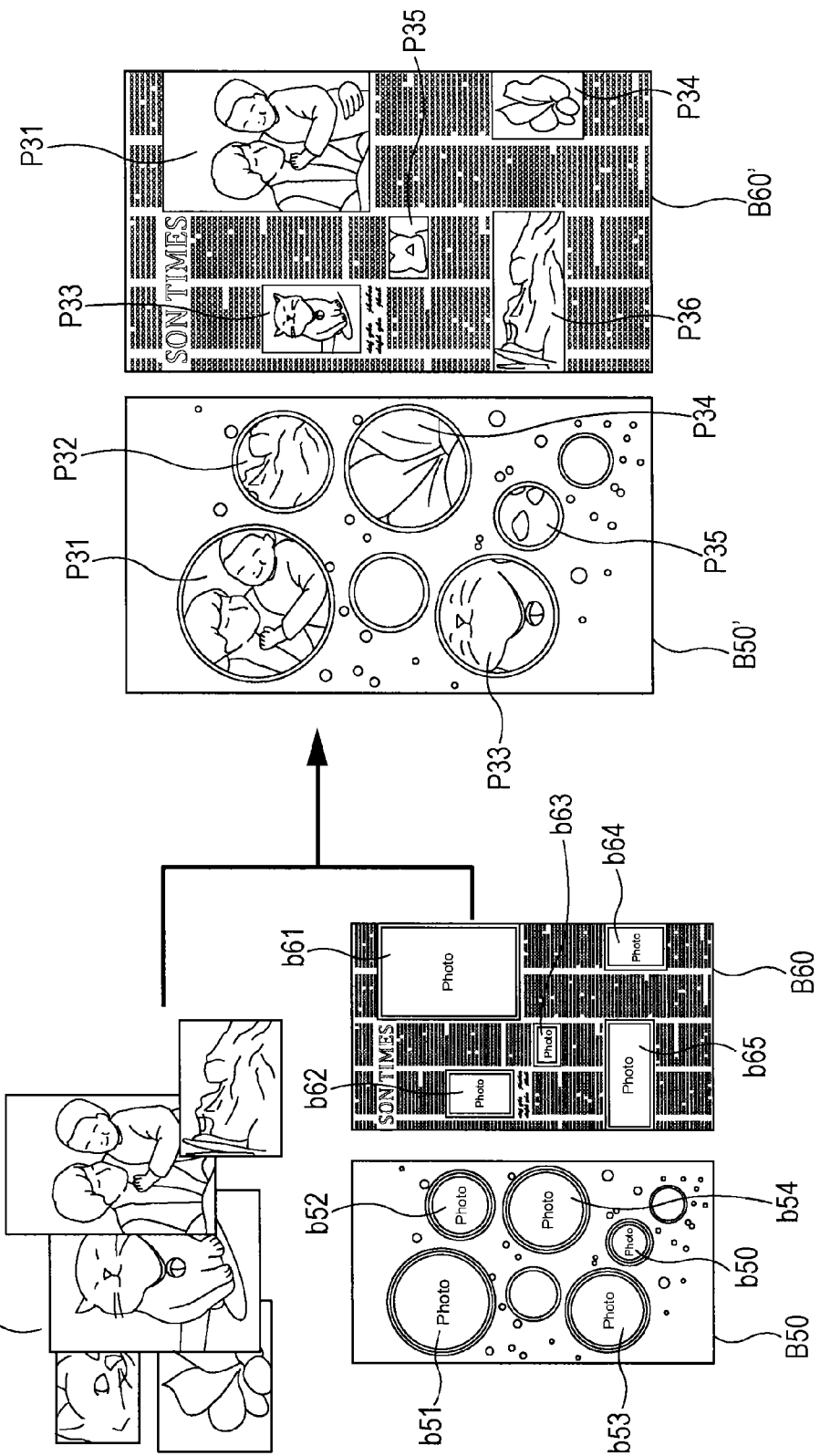
FIG. 9 is an explanatory diagram illustrating exemplary display images resulting from a third display process according to an embodiment of the present disclosure.

FIG. 8 is a flowchart illustrating an exemplary third template image display process, while FIG. 9 illustrates exemplary template images created with the display process. This example applies image effect processing specified by attributes set for windows in a template to still images. Turning an image into a fisheye and turning an image into a sepia-colored image are examples of such effect processing.

An image compositing process that disposes images in the template image in this example will be described following the flowchart in FIG. 8.

First, it is determined whether or not a candidate still image exists (step S31). At this point, the template image creation process herein ends in the case where a candidate still image does not exist.

Then, in the case where it is determined that a candidate still image does exist in an image file, etc., one image is randomly selected from among the images in that file (step S32), and it is determined whether or not a place to paste the selected image into the template exists (step S33). At this point, the template image creation process ends in the case where a place to paste does not exist.

In the case where it is determined in step S33 that a place to paste a template image does exist, the effect processing set in the attributes of the window at that place to paste is applied to the image that was selected in step S32. Size adjustment is conducted on the effect-processed image to enlarge or reduce it according to the window size (step S35). At this point, a cropping process is conducted in the case where cropping a portion of the image is necessary.

Then, an image compositing process that pastes the size-adjusted image in a corresponding window in the template acting as a board is conducted (step S36). After that, the process returns to step S31, and another image selection process is conducted.

FIG. 9 illustrates an example wherein template images have been created with the process illustrated by the flowchart in FIG. 8.

The example in FIG. 9 illustrates templates B50 and B60 which conduct two types of effect processing.

The template B50 disposes round windows b51 to b54 and sets effect processing that distorts an image as though it were shot with a fisheye lens as the attributes for each of the round windows b51 to b54.

Then, a plurality of images P31, P32, . . . , are prepared, and the corresponding effect processing is applied to an image randomly selected from among that plurality of images P31, P32, . . . for each of the windows b51 to b54. Having done so, each image is pasted to obtain the template image B50' illustrated on the right side of FIG. 9. In this example, an underwater background color is depicted as the background of the template B50.

The template B60 disposes rectangular windows b61 to b65 and sets effect processing which gives an image a specific color tone, such as a sepia-colored monochrome image, for example, as the attributes for each of the windows b61 to b65.

Then, a plurality of images P31, P32, . . . , are prepared, and the corresponding effect processing is applied to an image randomly selected from among that plurality of images P31, P32, . . . for each of the windows b61 to b65. Having done so, each image is pasted to obtain the template image B60' illustrated on the right side of FIG. 9. In this example, text strings resembling a sheet of newspaper are depicted as the background of the template B60.

[6. Fourth Display Process]

Figure 10:
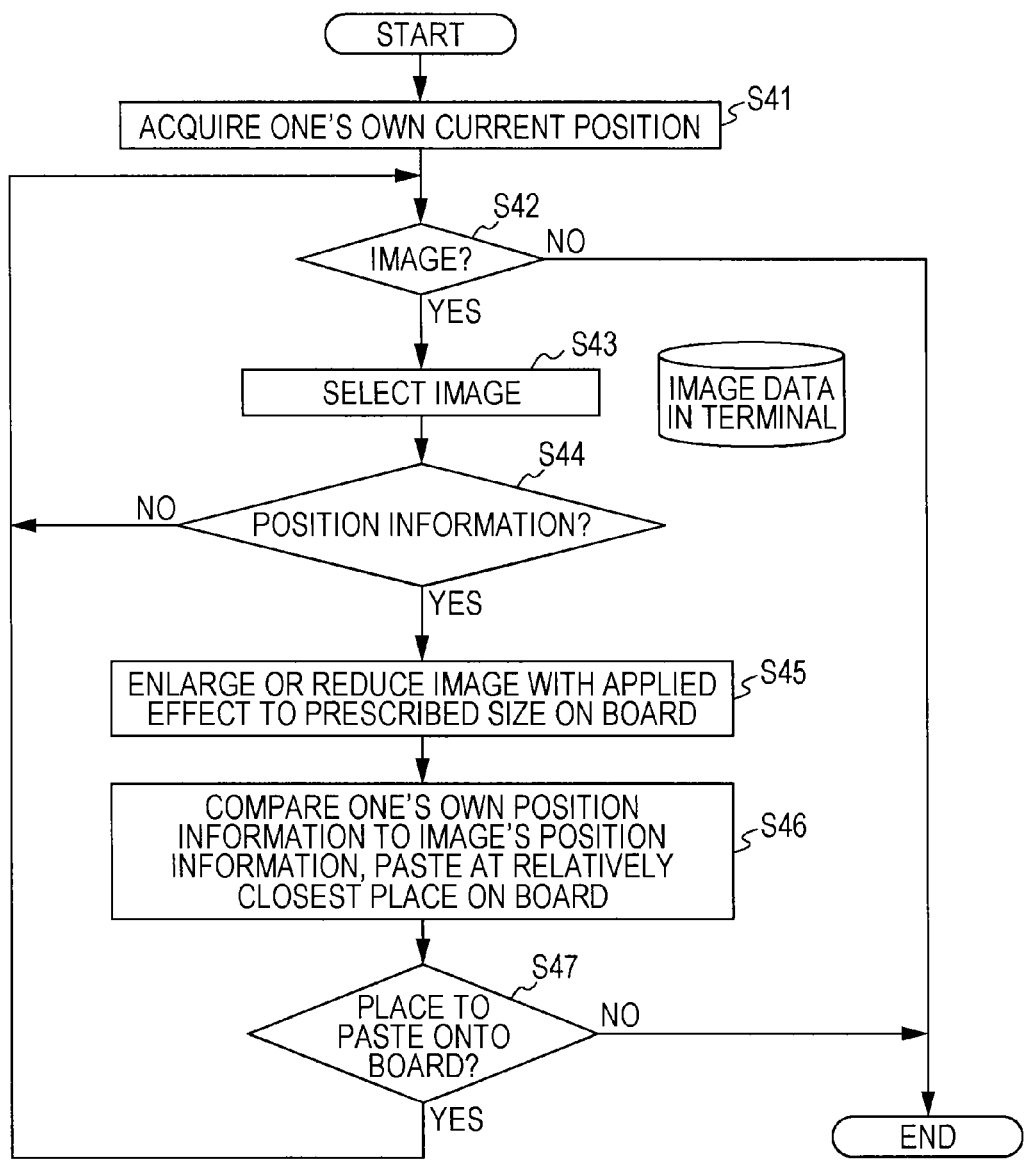
FIG. 10 is a flowchart illustrating a fourth display process according to an embodiment of the present disclosure.
Figure 11:
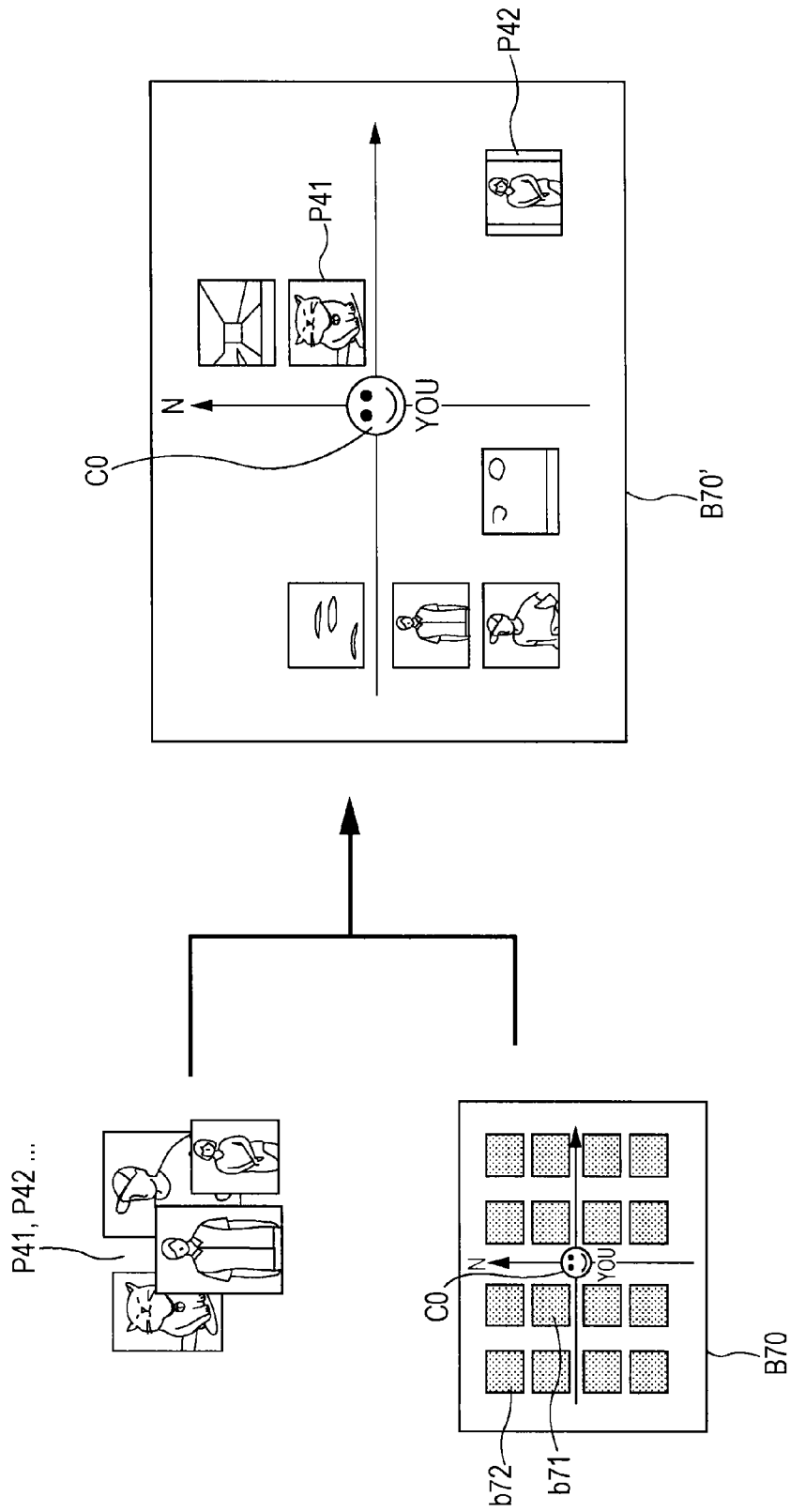
FIG. 11 is an explanatory diagram illustrating an exemplary display image resulting from a fourth display process according to an embodiment of the present disclosure.

FIG. 10 is a flowchart illustrating a fourth exemplary template image display process, while FIG. 11 illustrates an exemplary template image created with the display process. This example searches for images at a location or distance specified by attributes set for a window in the template, and disposes an image at that location or distance in the window. Consequently, attributes related to distances and directions from the location of the terminal device itself are applied to each of the windows in the template.

An image compositing process that disposes images in the template in this example will be described following the flowchart in FIG. 10.

First, the controller 108 of the terminal device 100 acquires the current location of the terminal device 100 itself (step S41). This current location is acquired from the GPS receiver 114, for example. Then, it is determined whether or not candidate still images to dispose on a template exist (step S42). At this point, the template image creation process herein ends in the case where candidate still images do not exist.

Meanwhile, in the case where it is determined that candidate images do exist in an image file, etc., one image is selected from among the images in that file (step S43), and it is determined whether or not information on the location where the image was shot is attached to the selected image (step S44). In the case where information on the location where the image was shot is not attached, the process for the current image ends at this point, the process returns to step S42, and another image is selected.

Meanwhile, in the case where it is determined in step S44 that an image with attached information on the location where the image was shot does exist, size adjustment is conducted to enlarge or reduce that image to the size of a window on the template acting as a board (step S45). Furthermore, the shooting location of that image is compared to the current location of the terminal device, and the image is pasted in the window at the position in the closest relative distance and direction from among the available windows (step S46). After that, it is determined whether or not a window without an image disposed therein still exists (step S47), and in the case where an empty window does not exist, the template image creation process ends.

Also, in the case where it is determined in step S47 that a window without an image disposed therein still exists, the process returns to step S42 and another image is selected.

FIG. 11 illustrates an example wherein a template image has been created with the process illustrated by the flowchart in FIG. 10.

The template B70 is provided with a central marker C0 which indicates the current location of the terminal device 100, with many windows b71, b72, . . . being disposed around that central marker C0. Also, directional axes passing through the central marker C0 are depicted on the template B70. In the example in FIG. 11, an example where the top indicates north is illustrated.

Then, a plurality of images P41, P42, . . . with respective information on their shooting locations are prepared, and the respective images are disposed according to the difference in distance and direction between the shooting locations of that plurality of images P41, P42, . . . and the current location of the terminal device 100 to yield a template image B70'. For example, in the example in FIG. 11, when an image P41 has been shot at a location comparatively close to the current location, and also when its shooting location is in a northern direction, the resulting image placement corresponds to that illustrated in FIG. 11. Also, when an image P42 has been shot at a location comparatively far from the current location, and also when its shooting location is in a south-eastern direction, the resulting image placement corresponds to that illustrated in FIG. 11.

[7. Fifth Display Process]

Figure 12:
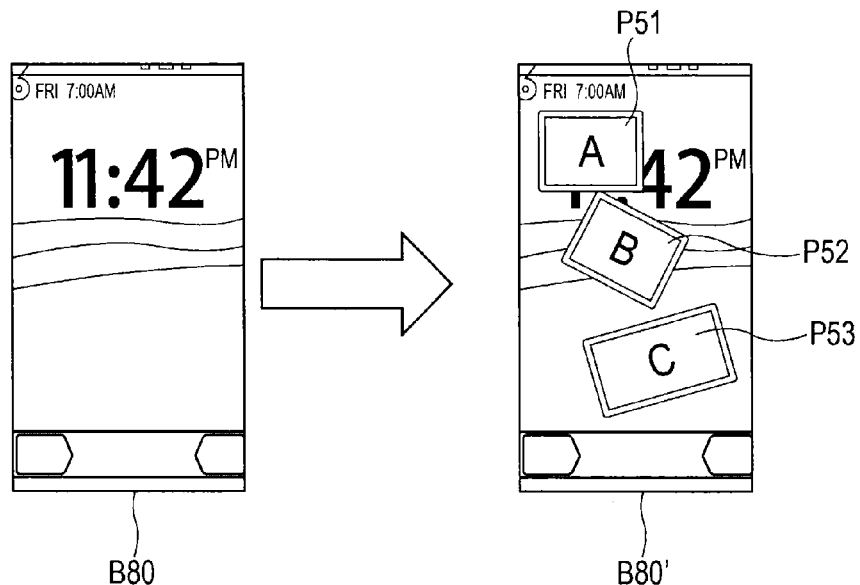
FIG. 12 is an explanatory diagram illustrating an exemplary display image resulting from a fifth display process according to an embodiment of the present disclosure.

FIG. 12 is a diagram illustrating a fifth exemplary template image display process.

In the example in FIG. 12, it is configured such that attributes are not only given to windows in a template, but rather attributes are also given to the template itself, and when disposing an image, the image is processed with the attributes of the whole template.

In other words, as illustrated in FIG. 12, a template B80 involves rendering with what is called a gradation process applied, which gradually changes the color and brightness of the background. At this point, a template image B80' in which images P51, P52, and P53 are disposed in respective windows involves varying the brightness of parts of the respectively disposed images P51, P52, and P53 according to the intensity of the background color. When varying an image according to the intensity of the background color in this way, information on attributes of the whole template are used. However, the images P51, P52, and P53 themselves which are disposed in the respective windows are taken to be images following the attributes of the individual windows. The respective examples described for the first through fourth template image display processes, for example, are applicable as window attributes.

[8. Sixth Display Process]

Figure 13:
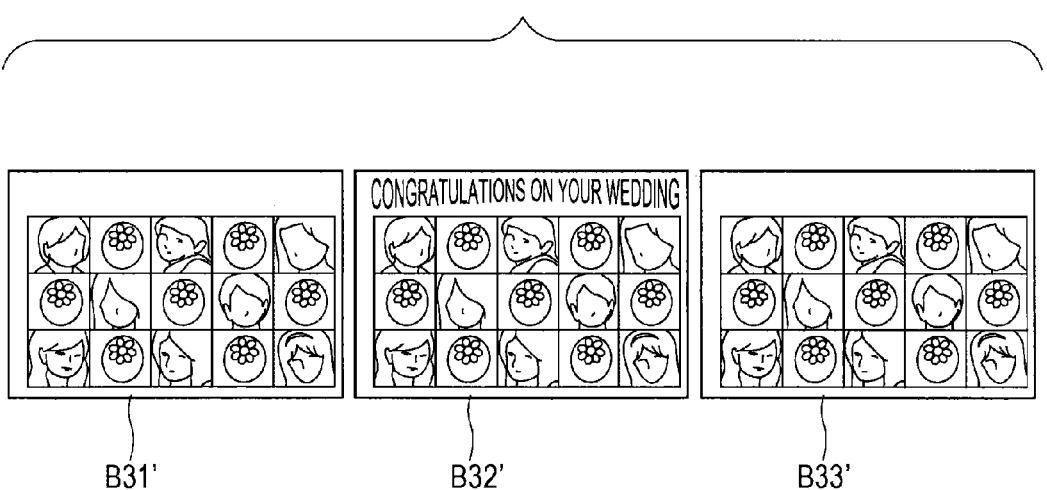
FIG. 13 is an explanatory diagram illustrating an exemplary display image resulting from a sixth display process according to an embodiment of the present disclosure.

FIG. 13 is a diagram illustrating a sixth exemplary template image display process.

In the example in FIG. 13, templates are composed of multiple screens. In other words, three consecutive templates B31, B32, and B33 are prepared, and images are disposed in the respective windows of these three templates B31, B32, and B33 by the respective processes already described. The three templates B31, B32, and B33 may be used successively, such that when images have been pasted into all windows of a single template B31, images are pasted into the next template B32, for example. Alternatively, it may be configured such that images are randomly pasted into the windows of the three templates B31, B32, and B33. The example in FIG. 13 is an example of expanding the template B30 of the first display process illustrated in FIG. 5 across multiple template images.

In the case of providing such a plurality of template images, the display shifts to the next adjacent template image as a result of the user performing a screen scrolling operation, for example.

[9. Seventh Display Process]

FIG. 14 is a diagram illustrating an exemplary seventh template image display process.

The example in FIG. 14 is an example of expanding a template illustrated in FIG. 11, in which images are disposed according to their distance and direction from the location of a terminal device, across multiple template images. In other words, as illustrated in FIG. 14, a map x is created and retained in the controller 108, in which images B1 to B4 and T1 to T4, etc. are disposed across a wide area according to their distance and direction from the central location C1 of a terminal device. Then, when displaying a template image, arrangements of images cropping specific areas from the map x are taken to be a plurality of template images B101', B102', B103', B104', and B105'. Specifically, a template image B101' indicating the vicinity of the central location C1 is prepared, and four template images B102' to B105' are disposed around it.

In the case of the example in FIG. 14, display likewise shifts to the next adjacent template image as a result of the user performing a screen scrolling operation, for example.

However, it may also be configured such that instead of preparing template images with fixed areas as illustrated in FIG. 14, an area to be displayed on a single screen is cropped from the map x, and a template image depicting an arrangement of images in that cropped area is displayed.

[10. Modifications]

Herein, the terminal device 100 described in the exemplary embodiments discussed above was configured as a mobile phone terminal, but it may also be applied to terminal devices with other configurations. For example, it is also applicable to what is called a tablet device provided with a comparatively large display panel approximately 10 cm to 30 cm on a side and upon which touch panel operations are conducted, and to a photo frame device that uses a display panel as a photo frame. It may also be applied to various other terminal devices. Also, it may be configured as a program executed by a computer, wherein a program executing the processing sequences illustrated in the respective flowcharts is installed to and executed by a computer.

Also, the respective examples discussed above, examples of pasting still images or images cropped from such still images into windows in a template were described. In contrast, however, a still image at a specific frame position may also be extracted from a motion image stored by a terminal device, and a process to paste the extracted still image into a window may be conducted. Alternatively, it may be configured such that a motion image is disposed in a window.

Also, in the respective examples discussed above, a process to dispose and display images that have been shot and stored by a camera unit was given. In contrast, however, it may also be configured such that a process is conducted with respect to images acquired by other methods, such as a process to dispose and display images acquired by a terminal device via the Internet or email, for example.

The present disclosure may be configured as follows:

(1) An information processing apparatus comprising: a memory that stores a plurality of images; and a controller that obtains a template having attributes applied to each of a plurality of display areas; selects images matching the attributes of each of the respective display areas from among the plurality of images stored in the memory; disposes the selected images in the respective display areas; and controls a display to display the template including the selected images disposed in the respective display areas.

(2) The information processing apparatus of (1), further comprising: a display that is controlled by the controller to display the template including the selected images disposed in the respective display areas.

(3) The information processing apparatus of (1), further comprising: an image capturing unit that captures one or more of the plurality of images stored by the memory.

(4) The information processing apparatus of (1), wherein the memory stores a plurality of templates and the controller obtains the template from the memory.

(5) The information processing apparatus of (1), wherein the controller processes the selected images to match a predetermined format corresponding to the respective display areas in which the selected images are disposed.

(6) The information processing apparatus of (5), wherein the predetermined format corresponds to a size of the display area, and the controller modifies a size of the selected image to match the size of the display area.

(7) The information processing apparatus of (5), wherein the predetermined format corresponds to a size of the display area, and the controller extracts a portion of the selected image that matches the size of the display area.

(8) The information processing apparatus of (5), wherein the predetermined format corresponds to a size of the display area, and the controller extracts a portion of the selected image including a person's face that matches the size of the display area.

(9) The information processing apparatus of (5), wherein the predetermined format corresponds to an orientation of the display area, and the controller modifies an orientation of the selected image to match the orientation of the display area.

(10) The information processing apparatus of (5), wherein the predetermined format corresponds to a visual effect applied to an image to be displayed in the display area, and the controller applied the visual effect to the selected image.

(11) The information processing apparatus of (10), wherein the visual effect corresponds to a change in color of the selected image.

(12) The information processing apparatus of (10), wherein the visual effect corresponds to a distortion of the selected image.

(13) The information processing apparatus of (1), wherein the attributes applied to each of the plurality of display areas correspond to a color.

(14) The information processing apparatus of (13), wherein the controller selects images having a color matching the colors of the respective display areas from among the plurality of images stored in the memory.

(15) The information processing apparatus of (1), wherein the attributes applied to each of the plurality of display areas correspond to a distance from the information processing apparatus.

(16) The information processing apparatus of (15), wherein the controller selects images having position information matching the distances corresponding to each of the respective display areas from among the plurality of images stored in the memory.

(17) An image processing method performed by an information processing apparatus, the image processing method comprising: obtaining a template having attributes applied to each of a plurality of display areas; selecting images matching the attributes of the respective display areas from among a plurality of images stored in a memory of the information processing apparatus; disposing the selected images matching the attributes of the respective display areas in the respective display areas; and controlling a display to display the template including the selected images disposed in the respective display areas.

(18) A non-transitory computer-readable medium including computer program instructions, which when executed by an information processing apparatus, cause the information processing apparatus to perform an image processing method comprising: obtaining a template having attributes applied to each of a plurality of display areas; selecting images matching the attributes of the respective display areas from among a plurality of images stored in a memory of the information processing apparatus; disposing the selected images matching the attributes of the respective display areas in the respective display areas; and controlling a display to display the template including the selected images disposed in the respective display areas.

The invention claimed is:

1. An information processing apparatus comprising:
a memory that stores a plurality of images; and
circuitry configured to:
obtain a template having attributes applied to each of a plurality of display areas, each of the display areas having a predetermined size and a predetermined location with respect to a marker indicating a current position of the information processing apparatus within an entire display area of a display;
select images matching the attributes of each of the respective display areas from among the plurality of images stored in the memory;
dispose the selected images in the respective display areas; and
control the display to display the template including the selected images disposed in the respective display areas, wherein
at least one of the attributes applied to each of the plurality of display areas corresponds to a distance and a direction from the current position of the information processing apparatus,
the circuitry selects images having position information from among the plurality of images stored in the memory,
the circuitry compares the position information of each of the selected images with the current position of the information processing apparatus,
the plurality of display areas are comprised of a plurality of predetermined windows,
the circuitry identifies, from among the plurality of predetermined windows, corresponding predetermined windows to dispose the selected images, based on the comparison between the position information of each of the selected images and the current position of the information processing apparatus, and
the circuitry disposes each of the selected images in the identified predetermined window at a position in a closest relative distance and direction among the plurality of predetermined windows such that each of the corresponding predetermined windows has an attribute of a closest relative distance and direction with respect to the marker, among the plurality of predetermined windows, to a distance and direction between the position information of each of the selected images disposed to the each of the corresponding predetermined windows and the current position of the information processing apparatus.

2. The information processing apparatus of claim 1, further comprising:
the display controlled by the circuitry to display the template including the selected images disposed in the respective predetermined windows.

3. The information processing apparatus of claim 1, further comprising:
an image capturing unit that captures one or more of the plurality of images stored by the memory.

4. The information processing apparatus of claim 1, wherein the memory stores a plurality of templates and the circuitry obtains the template from the memory.

5. The information processing apparatus of claim 1, wherein the circuitry processes the selected images to match a predetermined format corresponding to the respective predetermined windows in which the selected images are disposed.

6. The information processing apparatus of claim 5, wherein the predetermined format corresponds to a size of the display area, and the circuitry modifies a size of the selected image to match the size of the predetermined window.

7. The information processing apparatus of claim 5, wherein the predetermined format corresponds to a size of the display area, and the circuitry extracts a portion of the selected image that matches the size of the predetermined window.

8. The information processing apparatus of claim 5, wherein the predetermined format corresponds to a size of the predetermined window, and the circuitry extracts a portion of the selected image including a person's face that matches the size of the predetermined window.

9. The information processing apparatus of claim 5, wherein the predetermined format corresponds to air orientation of the predetermined window, and the circuitry modifies an orientation of the selected image to match the orientation of the predetermined window.

10. The information processing apparatus of claim 5, wherein the predetermined format corresponds to a visual effect applied to an image to be displayed in the predetermined window, and the circuitry applies the visual effect to the selected image.

11. The information processing apparatus of claim 10, wherein the visual fleet corresponds to a change in color of the selected image.

12. The information processing apparatus of claim 10, wherein the visual effect corresponds to a distortion of the selected image.

13. The information processing apparatus of claim 1, wherein the attributes applied to each of the plurality of predetermined windows correspond to a color.

14. The information processing apparatus of claim 13, wherein the circuitry selects images having a color matching the colors of the respective predetermined windows from among the plurality of images stored in the memory.

15. The information processing apparatus of claim 1, wherein the circuitry determines the current position of the information processing apparatus.

16. An image processing method performed by an information processing apparatus, the image processing method comprising:
obtaining a template having attributes applied to each of a plurality of display areas, each of the display areas having a predetermined size and a predetermined location with respect to a marker indicating a current position of the information processing apparatus within an entire display area of a display, the plurality of display areas being comprised of a plurality of predetermined windows;
selecting images matching the attributes of the respective display areas from among a plurality of images stored in a memory of the information processing apparatus;
disposing, using circuitry, the selected images matching the attributes of the respective display areas in the respective display areas; and
controlling a display to display the template including the selected images disposed in the respective display areas, wherein
at least one of the attributes applied to each of the plurality of display areas corresponds to a distance and a direction from the current position of the information processing apparatus,
the selecting includes selecting images having position information from among the plurality of images stored in the memory,
the image processing method further comprising:
comparing the position information of the selected images with the current position of the information processing apparatus; and
identifying, from among the plurality of predetermined windows, corresponding predetermined windows to dispose the selected images, based on the comparison between the position information of each of the selected images and the current position of the information processing apparatus, and
disposing each of the selected images in the identified predetermined window at a position in a closest relative distance and direction among the plurality of predetermined windows such that each of the corresponding predetermined windows has an attribute of a closest relative distance and direction with respect to the marker, among the plurality of predetermined windows, to a distance and direction between the position information of each of the selected images disposed to the each of the corresponding predetermined windows and the current position of the information processing apparatus.

17. A non-transitory computer-readable medium including computer program instructions, which when executed by an information processing apparatus, cause the information processing apparatus to perform an image processing method comprising:
obtaining a template having attributes applied to each of a plurality of display areas, each of the display areas having a predetermined size and a predetermined location with respect to a marker indicating a current position of the information processing apparatus within an entire display area of a display, the plurality of display areas being comprised of a plurality of predetermined windows;
selecting images matching the attributes of the respective display areas from among a plurality of images stored in a memory of the information processing apparatus;
disposing the selected images matching the attributes of the respective display areas in the respective display areas; and
controlling a display to display the template including the selected images disposed in the respective display areas, wherein
at least one of the attributes applied to each of the plurality of display areas corresponds to a distance id a direction from the current position of the information processing apparatus,
the selecting includes selecting images having position information from among the plurality of images stored in the memory,
the image processing method further comprising:
comparing the position information of the selected images with the current position of the information processing apparatus; and
identifying, from among the plurality of predetermined windows, corresponding predetermined windows to dispose the selected images, based on the comparison between the position information of each of the selected images and the current position of the information processing apparatus, and
disposing each of the selected images in the identified predetermined window at a position in a closest relative distance and direction among the plurality of predetermined windows such that each of the corresponding predetermined windows has an attribute of a closest relative distance and direction with respect to the marker, among the plurality of predetermined windows, to a distance and direction between the position information of each of the selected images disposed to the each of the corresponding predetermined windows and the current position of the information processing apparatus.

18. The information processing apparatus of claim 1, wherein the predetermined windows are arranged regularly with a fixed interval two-dimensionally within the entire display area of the display.

19. The information processing apparatus of claim 1, wherein
   the template is divided into a plurality of sub-templates, and
   the circuitry is configured to control the display to display one sub-template of the plurality of sub-templates, and display another sub-template of the plurality of sub-templates in response to a scrolling operation.

* * * * *